United States Patent
Sastri et al.

[11] Patent Number: 5,925,475
[45] Date of Patent: Jul. 20, 1999

[54] PHTHALONITRILE THERMOSET POLYMERS AND COMPOSITES CURED WITH HALOGEN-CONTAINING AROMATIC AMINE CURING AGENTS

[75] Inventors: Satya B. Sastri, Greenbelt, Md.; Teddy M. Keller, Alexandria, Va.

[73] Assignee: United States of America as represented by the Secretary of the Navy, Washington, D.C.

[21] Appl. No.: 08/940,036

[22] Filed: Oct. 2, 1997

Related U.S. Application Data

[51] Int. Cl.$^6$ .................................................. C08G 73/06
[52] U.S. Cl. ......................... 428/704; 428/921; 528/188; 528/191; 528/353; 528/401
[58] Field of Search .................... 528/335, 342, 528/347, 183, 185, 188, 191, 353, 401; 428/704, 921

[56] References Cited

U.S. PATENT DOCUMENTS

| | | | |
|---|---|---|---|
| 3,686,149 | 8/1972 | Ohfuji et al. | |
| 5,003,039 | 3/1991 | Keller | 528/183 |
| 5,003,078 | 3/1991 | Keller | 548/406 |
| 5,004,801 | 4/1991 | Keller | 528/360 |
| 5,202,414 | 4/1993 | Keller | 528/481 |
| 5,242,755 | 9/1993 | Keller et al. | 428/457 |
| 5,350,828 | 9/1994 | Keller | 528/183 |
| 5,464,926 | 11/1995 | Keller | 528/206 |

FOREIGN PATENT DOCUMENTS 519436   9/1976   U.S.S.R. .

OTHER PUBLICATIONS

Heto, WPIDS AN 77–32238Y, Abstracting SU 519436, Sep. 1976.

*Primary Examiner*—Jeffrey C. Mullis
*Attorney, Agent, or Firm*—Thomas E. Mcdonnell; Ralph T. Webb

[57] ABSTRACT

Phthalonitrile thermoset polymers and composites having flame resistance are formed by combining a phthalonitrile monomer in the melt stage with a halogen-containing aromatic amine curing agent. The halogen-containing aromatic amine curing agent is selected from the group consisting of aromatic amine curing agents having the general formula:

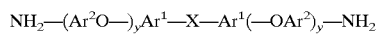

wherein $Ar^1$ and $Ar^2$ are substituted or unsubstituted aromatic groups, y is 0 or greater, and X is $-C(CF_3)_2-$ and aromatic amine curing agents having the general formula:

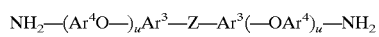

wherein Z is a connecting bond or a linking group other than oxygen or $-C(CF_3)_2-$, u is 0 or greater, and $Ar^3$ and $Ar^4$ are aromatic groups and wherein either $Ar^3$ or $Ar^1$ or both $Ar^3$ and $Ar^4$ are substituted with at least one halogen atom or halo-substituted alkyl group.

21 Claims, No Drawings

PHTHALONITRILE THERMOSET POLYMERS AND COMPOSITES CURED WITH HALOGEN-CONTAINING AROMATIC AMINE CURING AGENTS

BACKGROUND OF THE INVENTION

1. Field of the Invention

The invention relates to flame-resistant phthalonitrile thermoset polymers and composites that are cured with halogen-containing aromatic amine curing agents.

2. Description of the Related Art

Phthalonitrile resins made using amine curing agents are described in Keller, T. M. and Price, T. R., "Amine-Cured Bisphenol-Linked Phthalonitrile Resins", J. Macromol. Sci.-Chem., A18(6), pp. 931–937 (1982), U.S. Pat. Nos. 4,408,035 to Keller, 5,003,039 to Keller, 5,003,078 to Keller, 5,004,801 to Keller, 5,132,396 to Keller, 5,139,054 to Keller, 5,208,318 to Keller, 5,237,045 to Burchill et al, 5,292,854 to Keller and 5,350,828 to Keller et al., the disclosures of which are incorporated herein by reference.

For many practical applications, such as for structural material for ships, it is desirable that a resin-based material exhibit good flame resistance. Very good flame resistance may be obtained with phthalonitrile polymers and composites such as are described above. However, for specialized applications such as for structural material for submarines, there is always a need for material that has even better flame resistance than is currently obtainable.

SUMMARY OF THE INVENTION

Accordingly, it is an object of the invention to provide phthalonitrile thermoset resins and composites that have improved the flame resistance.

This and other objects are accomplished by providing thermoset polymers and fiber-reinforced composites cured with an aromatic amine curing agent selected from the group consisting of aromatic amine curing agents having the general formula

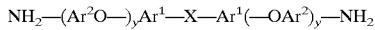

wherein $Ar^1$ and $Ar^2$ are substituted or unsubstituted aromatic groups, y is 0 or greater, and X is —$C(CF_3)_2$— and aromatic amine curing agents having the general formula:

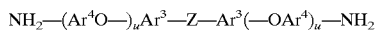

wherein Z is a connecting bond or a linking group other than oxygen or —$C(CF_3)_2$—, u is 0 or greater, and $Ar^3$ and $Ar^4$ are aromatic groups and wherein either $Ar^3$ or $Ar^4$ or both $Ar^3$ and $Ar^4$ are substituted with at least one halogen atom or halo-substituted alkyl group.

DETAILED DESCRIPTION OF THE PREFERRED EMBODIMENT

The invention relates to flame resistant phthalonitrile thermoset polymers and composites that are cured with an aromatic amine curing agent that has one or more halogen substituents substituted on the aromatic rings or attached to a linking group between two aromatic groups. In particular, the halogen-containing aromatic amine curing agents are compounds selected from the group consisting of aromatic amine curing agents having the general formula

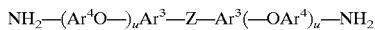

wherein $Ar^1$ and $Ar^2$ are substituted or unsubstituted aromatic groups, y is 0 or greater, and X is —$C(CF_3)_2$— and aromatic amine curing agents having the general formula:

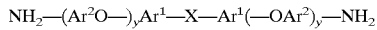

wherein Z is a connecting bond or a linking group other than oxygen or —$C(CF_3)_2$—, u is 0 or greater, and $Ar^3$ and $Ar^4$ are aromatic groups and wherein either $Ar^3$ or $Ar^4$ or both $Ar^3$ and $Ar^4$ are substituted with at least one halogen atom or halo-substituted alkyl group. Preferably, Z is a connecting bond or an electron-withdrawing linking group selected from the group consisting of —CO—, —$SO_2$—, —$C(CF_3)_2$—, —O—PO($R^1$)—O— and —PO($R^1$)—, where $R^1$ is an alkyl or aryl group. Preferably y and u in the above formulas are less than 10, and more preferably less than 5. Most preferably, the halogen-containing aromatic amine curing agent is selected from the group consisting of 3,3'-dichloro-4,4'-diaminodiphenylsulfone, 2,2'-bis(trifluoromethyl)-4,4'-diaminobiphenyl, 2,2'-bis(4-aminophenyl)hexafluoropropane, bis[4-(4-aminophenoxy)phenyl]2,2'-hexafluoropropane, 1,1-bis(4-aminophenyl)-1-phenyl-2,2,2-trifluoroethane, 3,3'-dichloro-4,4'-diaminobenzophenone, and 3,3'-dibromo-4,4'-diaminobenzophenone.

The halogen-containing aromatic amine curing agents described above may be made by any synthesis method known in the art.

Any polymerizable phthalonitrile monomer may be used as the starting monomer. Examples of suitable phthalonitrile monomers are given in U.S. Pat. Nos. 3,730,946, 3,763,210, 3,787,475, 3,869,499, 3,972,902, 4,209,458, 4,223,123, 4,226,801, 4,234,712, 4,238,601, 4,304,896, 4,315,093, 4,351,776, 4,408,035, 4,409,782, 5,003,039, 5,003,078, 5,159,054, 5,242,755, 5,352,760, and 5,464,926. All of these patents are incorporated herein by reference. For example, the phthalonitrile monomer may be a monomer such as is described in U.S. Pat. No. 5,003,078 and having the formula:

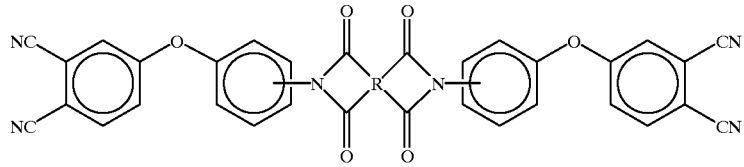

where R is a tetravalent radical or substituted aromatic tetravalent radical of the general formula:

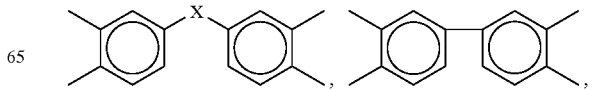

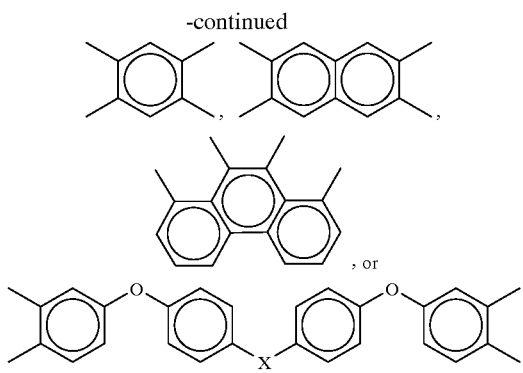

where X is

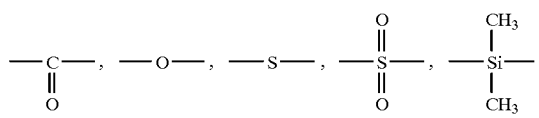

any alkylene of up to six carbon atoms or any halogenated alkylene of up to six carbon atoms. By the word "substituted", it is meant that any known substituent could be attached to the aromatic moiety. Substituents include but are not limited to halogens, chalcogens, and organic radicals such as phenyl, alcohol, carboxyl, carbonyl, or aliphatic groups of less than 10 carbon atoms. The phthalonitrile monomer could also be a monomer such as is described in U.S. Pat. No. 5,464,926 of the formula:

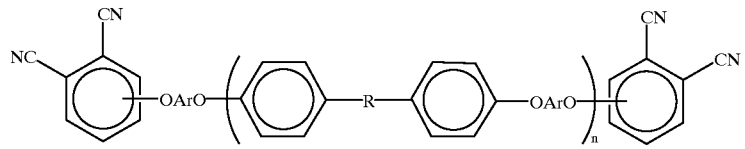

wherein Ar represents an aromatic group, R represents

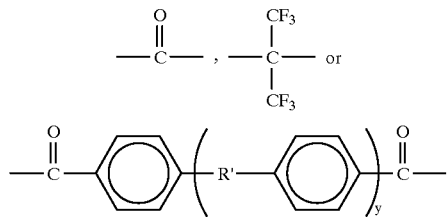

R' represents

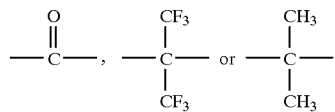

y is an integer having a value of 0 to 4; and
n represents an average value of from 1 to about 100.

Preferably, the phthalonitrile monomer is selected from the group consisting of 4,4'-bis(3,4-dicyanophenoxy) biphenyl, 2,2-bis[4-(3,4-dicyanophenoxy)phenyl] hexafluoropropane, 2,2-bis[4-(3,4-dicyanophenoxy)phenyl] propane and bis[4-(3,4-dicyanophenoxy)phenyl]sulfone. The greatest flame resistance may be obtained by using a phthalonitrile monomer that also contains a halogen, such as 2,2-bis[4-(3,4-dicyanophenoxy)phenyl]hexafluoropropane or oligomeric multiple aromatic ether fluorine-containing phthalonitrile monomer prepared from 4,4'-difluorobenzophenone, bisphenol A6F, and 4-nitrophthalonitrile as described in U.S. Pat. No. 5,464,926.

The phthalonitrile thermoset polymer of the present invention may be made by any method disclosed in the above references.

The fiber-reinforced composite of the present invention may be made by a process of heating a phthalonitrile monomer to its melt stage, combining the phthalonitrile monomer in the melt stage with a halogen-containing aromatic amine-containing curing agent to form a prepolymer mixture, heating the prepolymer mixture at a temperature greater than the melting temperature of the prepolymer mixture and equal to or less than about 375° C., impregnating or coating a fibrous material with the prepolymer mixture to form a fiber-containing composition, and continuing to heat the fiber-containing composition at a temperature above the melting point of the prepolymer mixture and at or below about 375° C. for a sufficient time to cure the fiber-containing composition to form a fiber-reinforced composite.

When the aromatic amine curing agent is added to the melted phthalonitrile monomer to form a prepolymer mixture, some curing begins to take place immediately. The curing reaction may be quenched at an early stage to form a B-stage prepolymer that can be stored indefinitely at room temperature and used at a later time to create the fiber-reinforced composite.

Any fibrous material suitable for forming fiber-reinforced composites can be used in the present invention. Typical fibrous material includes carbon fibers, aramid fibers, glass fibers or ceramic fibers. The fibrous material may be in any form including woven fabrics, nonwoven mats, braids or tow.

The steps of impregnating or coating the fibrous material to create a fiber-containing composition and of curing the fiber-containing composition to form a fiber-reinforced composite may by carried out by any method known in the art for creating fiber-reinforced composites. In particular, conventional methods of prepreg consolidation, filament winding, resin transfer and resin infusion such as are described in Sastri et al, "Phthalonitrile-Carbon Fiber Composites" Polymer Composites, December 1996, Vol. 17, No.6, pp 816–822 and Sastri et al "Phthalonitrile-Glass Fabric Composites", Polymer Composites, February 1997, Vol. 18, No. 1, pp 48–54 may be used. As used herein, the term "impregnating" a fibrous material means saturating the fibrous material with the prepolymer mixture, such as is typically done in the conventional methods of resin transfer and resin infusion or other methods. The term "coating" the fibrous material means covering the fibrous material with the prepolymer mixture such as is typically done in conventional methods of prepreg consolidation and filament winding or other methods.

Having described the invention, the following examples are given to illustrate specific applications of the invention, including the best mode now known to perform the invention. These specific examples are not intended to limit the scope of the invention described in this application.

EXAMPLES

Example 1

4,4'-Bis(3,4-Dicyanophenoxy)Biphenyl Prepolymer Synthesis with Bis[4-(4-Aminophenoxy)Phenyl]2, 2'-Hexafluoropropane (FA)

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 255° C. At this time, 4.43 wt. % of bis[4-(4-aminophenoxy)phenyl]2,2'-hexafluoropropane (FA) (8.55 mmoles) was added to the monomer melt, stirred for 15 minutes and quenched to room temperature. The prepolymer was pulverized to a fine powder and used for cure studies.

Example 2

2,2-Bis[4-(3,4-Dicyanophenoxy)Phenyl] Hexafluoropropane Prepolymer Synthesis with Bis [4-(4-Aminophenoxy)Phenyl]2,2'-Hexafluoropropane (FA)

1.5 g of 2,2-bis[4-(3,4-dicyanophenoxy)phenyl] hexafluoropropane monomer was melted in an aluminum planchet on top of a hot plate. To the melt at 250° C. was added 4.0 wt. % of bis[4-(4-aminophenoxy)phenyl]2,2'-hexafluoropropane (FA) (0.116 mmoles) with stirring followed by quenching to room temperature after 15 minutes. The prepolymer was finely ground to a fine powder and used for cure studies.

Example 3

2,2-Bis[4-(3,4-Dicyanophenoxy)Phenyl]Propane Prepolymer Synthesis with Bis[4-(4-Aminophenoxy)Phenyl]2,2'-Hexafluoropropane (FA)

1.5 g of 2,2-bis[4-(3,4-dicyanophenoxy)phenyl]propane monomer was melted in an aluminum planchet on top of a hot plate. To the melt at 250° C. was added 5.0 wt. % of bis[4-(4-aminophenoxy)phenyl]2,2'-hexafluoropropane (FA) (0.145 mmoles) with stirring followed by quenching to room temperature after 15 minutes. The prepolymer was finely ground to a fine powder and used for cure studies.

Example 4

Bis[4-(3,4-Dicyanophenoxy)Phenyl]Sulfone Prepolymer Synthesis with 3,3'-Dichloro-4,4'-Diaminobenzophenone 1.5 g of bis[4-(3,4-dicyanophenoxy)phenyl]sulfone monomer was melted in an aluminum planchet on top of a hot plate. To the melt at 250° C. was added 3.5 wt. % of 3,3'-dichloro-4,4'-diaminobenzophenone (0.177 mmoles) with stirring followed by quenching to room temperature after 15 minutes. The prepolymer was finely ground to a fine powder and used for cure studies.

Example 5

Oligomeric Multiple Aromatic Ether-Containing Phthalonitrile Monomer Prepolymer Synthesis with Bis[4-(4-Aminophenoxy)Phenyl]2,2'-Hexafluoropropane (FA)

1.5 g of oligomeric multiple aromatic ether-containing phthalonitrile monomer prepared from 4,4'-difluorobenzophenone (12.01 g, 55.1 mmol), 4,4'-dihydrobiphenyl (20.11 g, 108.1 mmol), and 4-nitrophthalonitrile (19.0 g, 109.8 mmol) as described in U.S. Pat. No. 5,464,926 was melted in an aluminum planchet on top of a hot plate. To the melt at 250° C. was added 4.0 wt. % of FA (0.116 mmoles) with stirring followed by quenching to room temperature after 15 minutes. The prepolymer was finely ground to a fine powder and used for cure studies.

Example 6

Oligomeric Multiple Aromatic Ether Fluorine-Containing Phthalonitrile Monomer Prepolymer Synthesis with Bis[4-(4-Aminophenoxy)Phenyl]2, 2'-Hexafluoropropane (FA)

1.5 g of oligomeric multiple aromatic ether fluorine-containing phthalonitrile monomer prepared from 4,4'-difluorobenzophenone (4.0 g, 18.4 mmol), bisphenol A6F (12.33 g, 36.7 mmol), and 4-nitrophthalonitrile (6.37 g, 36.8 mmol) as described in U.S. Pat. No. 5,464,926 was melted in an aluminum planchet on top of a hot plate. To the melt at 250° C. was added 4.0 wt. % of FA (0.116 mmoles) with stirring followed by quenching to room temperature after 15 minutes. The prepolymer was finely ground to a fine powder and used for cure studies.

Obviously, many modifications and variations of the present invention are possible in light of the above teachings. It is therefore to be understood that, within the scope of the appended claims, the invention may be practiced otherwise than as specifically described.

What is claimed is:

1. A phthalonitrile thermoset polymer made by the process of curing a phthalonitrile monomer in the presence of a halogen-containing aromatic amine curing agent having the general formula

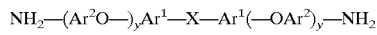

wherein $Ar^1$ and $Ar^2$ are substituted or unsubstituted aromatic groups, y is 0 or 1, and X is —C(CF$_3$)$_2$— or —CH(CF$_3$)— wherein the halogen-containing aromatic amine curing agent is present in the amount of about 1 to about 40 percent of the combined weight of the phthalonitrile monomer and the halogen containing aromatic amine curing agent.

2. The phthalonitrile thermoset polymer of claim 1 wherein the halogen-containing aromatic amine curing agent is present in the amount of about 1 to about 10 percent of the combined weight of the phthalonitrile monomer and the halogen-containing aromatic amine curing agent.

3. The phthalonitrile thermoset polymer of claim 1 wherein the halogen-containing aromatic amine curing agent is present in the amount of about 1 to about 2 percent of the combined weight of the phthalonitrile monomer and the halogen-containing aromatic amine curing agent.

4. The phthalonitrile thermoset polymer of claim 1 wherein the phthalonitrile monomer is a compound of the formula:

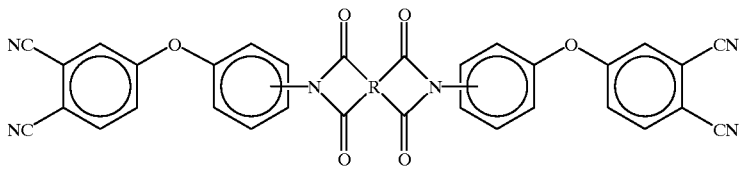

where R is a tetravalent radical or substituted aromatic tetravalent radical of the general formula:

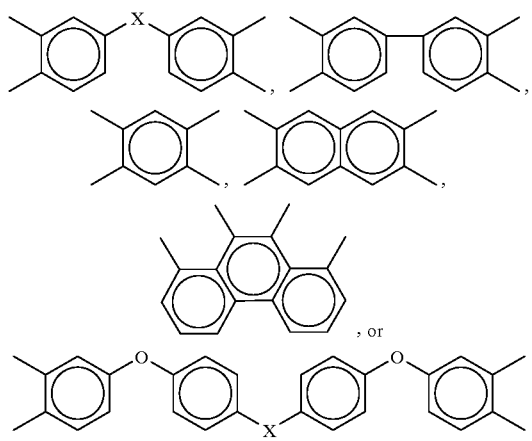

where X is

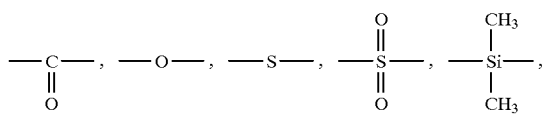

any alkylene of up to six carbon atoms or any halogenated alkylene of up to six carbon atoms.

5. The phthalonitrile thermoset polymer of claim 1 wherein the phthalonitrile monomer is a compound of the formula:

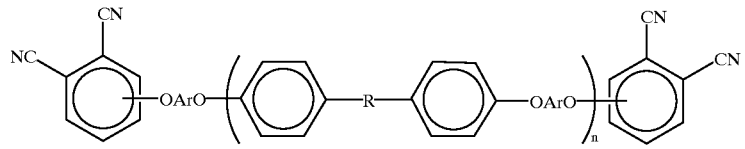

wherein Ar represents an aromatic group, R represents

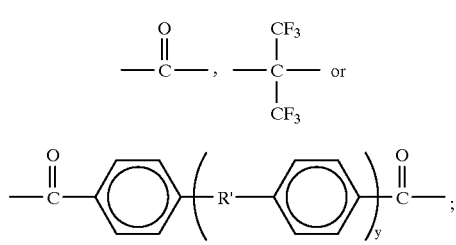

R' represents

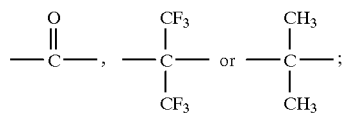

y is an integer having a value of 0 to 4; and n represents an average value of from 1 to about 100.

6. The phthalonitrile thermoset polymer of claim 1 wherein the phthalonitrile monomer is selected from the group consisting of 4,4'-bis(3,4-dicyanophenoxy)biphenyl, 2,2-bis[4-(3,4-dicyanophenoxy)phenyl]hexafluoropropane, 2,2-bis[4-(3,4-dicyanophenoxy)phenyl]propane and bis[4-(3,4-dicyanophenoxy)phenyl]sulfone and the aromatic amine curing agent is bis[4-(4-aminophenoxy)phenyl]2,2'-hexafluoropropane.

7. A phthalonitrile thermoset polymer made by the process of curing a phthalonitrile monomer in the presence of a halogen-containing aromatic amine curing agent selected from the group consisting of 2,2'-bis(trifluoromethyl)-4,4'-diaminobiphenyl, 2,2'-bis(4-aminophenyl)hexafluoropropane, bis[4-(4-aminophenoxy)phenyl]2,2'-hexafluoropropane, and 1,1-bis(4-aminophenyl)-1-phenyl-2,2,2-trifluoroethane wherein the halogen-containing aromatic amine curing agent is present in the amount of about 1 to about 40 percent of the combined weight of the phthalonitrile monomer and the halogen containing aromatic amine curing agent.

8. A phthalonitrile thermoset polymer made by the process of curing a phthalonitrile monomer in the presence of a halogen-containing aromatic amine curing agent having no aromatic rings linked by oxygen and having the general formula:

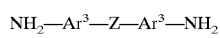

$NH_2-Ar^3-Z-Ar^3-NH_2$ wherein Z is a connecting bond or a linking group other than $-C(CF_3)_2-$ and $Ar^3$ is an aromatic group substituted with at least one halogen atom or halo-substituted alkyl group.

9. A phthalonitrile thermoset polymer made by the process of curing a phthalonitrile monomer in the presence of a halogen-containing aromatic amine curing agent selected from the group consisting of 3,3'-dichloro-4,4'-diaminodiphenylsulfone, 3,3'-dichloro-4,4'-diaminobenzophenone, and 3,3'-dibromo-4,4'-diaminobenzophenone.

10. A fiber-reinforced thermoset composite made by a process comprising the steps of:

(a) heating a phthalonitrile monomer to its melt stage,
(b) combining the phthalonitrile monomer in the melt stage with an aromatic amine curing agent to form a prepolymer mixture,
(c) heating the prepolymer mixture at a temperature greater than the melting temperature of the prepolymer mixture and equal to or less than about 375° C.,
(d) impregnating or coating a fibrous material with the prepolymer mixture to form a fiber-containing composition, and
(e) continuing to heat the fiber-containing composition at a temperature above the melting point of the prepolymer mixture and at or below about 375° C. for a sufficient time to cure the fiber-containing composition to form a fiber-reinforced composite, wherein the aromatic amine curing agent has the general formula:

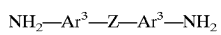
NH$_2$—Ar$^3$—Z—Ar$^3$—NH$_2$ having no aromatic rings linked by oxygen and wherein Z is a connecting bond or a linking group other than —C(CF$_3$)$_2$— and Ar$^3$ is an aromatic group substituted with at least one halogen atom or halo-substituted alkyl group.

11. A fiber-reinforced thermoset composite made by a process comprising the steps of:
(a) heating a phthalonitrile monomer to its melt stage,
(b) combining the phthalonitrile monomer in the melt stage with an aromatic amine curing agent to form a prepolymer mixture,
(c) heating the prepolymer mixture at a temperature greater than the melting temperature of the prepolymer mixture and equal to or less than about 375° C.,
(d) impregnating or coating a fibrous material with the prepolymer mixture to form a fiber-containing composition, and
(e) continuing to heat the fiber-containing composition at a temperature above the melting point of the prepolymer mixture and at or below about 375° C. for a sufficient time to cure the fiber-containing composition to form a fiber-reinforced composite, wherein the aromatic amine curing agent has the general formula

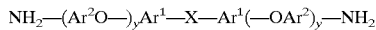
NH$_2$—(Ar$^2$O—)$_y$Ar$^1$—X—Ar$^1$(—OAr$^2$)$_y$—NH$_2$ wherein Ar$^1$ and Ar$^2$ are substituted or unsubstituted aromatic groups, y is 0 or greater, and X is —C(CF$_3$)$_2$— or —CH(CF$_3$)—.

12. The fiber-reinforced thermoset composite of claim 11, wherein the fibrous material is carbon fiber.

13. The fiber-reinforced thermoset composite of claim 11, wherein the fibrous material is glass fiber.

14. The fiber-reinforced thermoset composite of claim 11, wherein the fibrous material is in the form of fiber braids.

15. The fiber-reinforced thermoset composite of claim 11, wherein the step (d) of impregnating or coating the fibrous material with the prepolymer mixture is carried out by resin transfer molding.

16. The fiber-reinforced thermoset composite of claim 11, wherein the step (d) of impregnating or coating the fibrous material with the prepolymer mixture is carried out by resin infusion molding.

17. The fiber-reinforced thermoset composite of claim 11, wherein the step (d) of impregnating or coating the fibrous material with the prepolymer mixture includes forming a prepreg.

18. The fiber-reinforced thermoset composite of claim 11, wherein the step of impregnating the fibrous material with the prepolymer mixture is carried out by filament winding.

19. The fiber-reinforced thermoset composite of claim 11, wherein the phthalonitrile monomer is a compound of the formula:

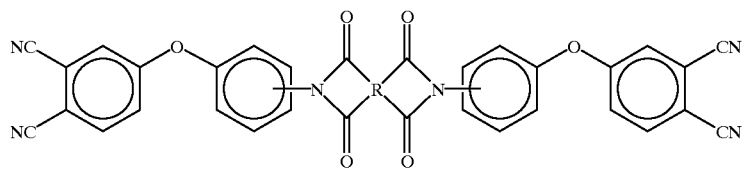

where R is a tetravalent radical or substituted aromatic tetravalent radical of the general formula:

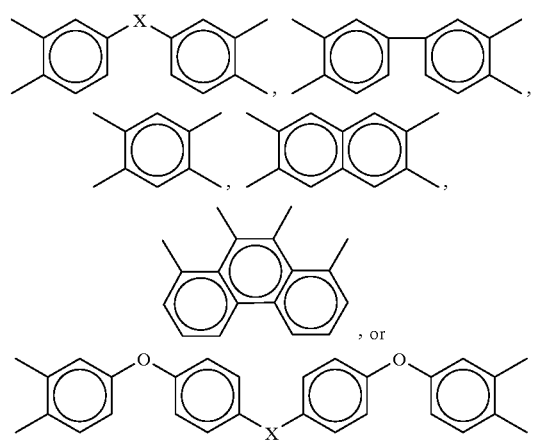

where X is

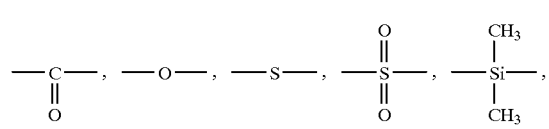

any alkylene of up to six carbon atoms or any halogenated alkylene of up to six carbon atoms.

20. The fiber-reinforced thermoset composite of claim 11, wherein the phthalonitrile monomer is the formula:

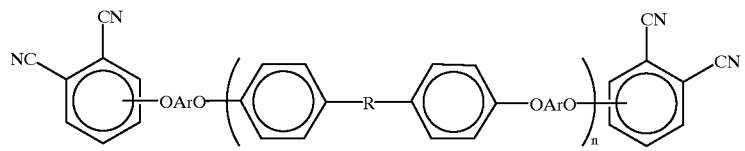

wherein Ar represents an aromatic group, R represents

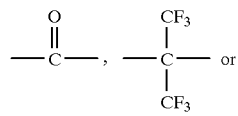

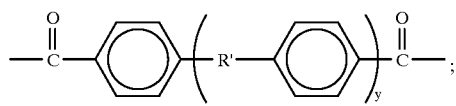

R' represents $$-\overset{O}{\underset{\|}{C}}-,\quad -\underset{CF_3}{\overset{CF_3}{\underset{|}{C}}}-\text{ or }-\underset{CH_3}{\overset{CH_3}{\underset{|}{C}}}-;$$

y is an integer having a value of 0 to 4; and
n represents an average value of from 1 to about 100.

21. The fiber-reinforced thermoset composite of claim 11, wherein the phthalonitrile monomer is selected from the group consisting of 4,4'-bis(3,4-dicyanophenoxy)biphenyl, 2,2-bis[4-(3,4-dicyanophenoxy)phenyl]hexafluoropropane, 2,2-bis[4-(3,4-dicyanophenoxy)phenyl]propane and bis[4-(3,4-dicyanophenoxy)phenyl]sulfone and the aromatic amine curing agent is bis[4-(4-aminophenoxy)phenyl]2,2'-hexafluoropropane.

* * * * *